Aug. 25, 1959     A. MAURER ET AL     2,901,072

OVER-RUNNING CLUTCH COUPLINGS OR THE LIKE

Filed May 27, 1957

INVENTORS
ALBRECHT MAURER
EMIL GIESE
BY
Bailey, Stephens & Huettig
ATTORNEYS

United States Patent Office 2,901,072
Patented Aug. 25, 1959

2,901,072

OVER-RUNNING CLUTCH COUPLINGS OR THE LIKE

Albrecht Maurer and Emil Giese, Homburg vor der Hohe, Germany, assignors to Ringspann Albrecht Maurer K.G., Homburg vor der Hohe, Germany, a firm of Germany Application May 27, 1957, Serial No. 661,667

Claims priority, application Germany June 1, 1956

4 Claims. (Cl. 192—45.1)

The present invention relates to improvements in over-running, indexing, and backstopping clutch couplings.

There are numerous known designs of over-running clutch couplings in which a plurality of wedge members, generally called "sprags" are interposed between a hardened, internally cylindrical outer race and a coaxial externally cylindrical inner race which is likewise hardened. Additional means such as springs or the like are provided for maintaining the sprags in engagement with the two races whereby, when one of the races has the tendency to turn in one direction relative to the other race, the two races will be locked to each other, while the races are freely rotatable relative to each other in the other direction.

The sprags of the over-running clutches of prior design usually have one or another or all of the following disadvantages which detrimentally affect the operation of the respective clutch and shorten the length of time during which it will properly carry out its functions.

These disadvantages may be enumerated as follows:

(a) When the sprags are tilted from the wedging position to the over-running position, they will occupy a greater space in the peripheral direction and press or wedge against each other.

(b) The amount of space required for each sprag in the peripheral direction is to a great extent dependent upon the total number of sprags provided in the over-running clutch.

(c) As the rate of speed increases the centrifugal force acting upon the individual sprags will turn them in the direction in which they exert a wedging action upon the races with the result that the friction normally prevailing between the sprags and the inner race will increase considerably.

(d) The hertzian pressure exerted between the individual sprags and the inner race is greater than that between the sprags and the outer race.

It is the principal object of the present invention to provide an over-running clutch coupling which overcomes all of the above enumerated disadvantages.

The principal merit of the present invention resides in the fact that for the first time it accurately determines the conditions which have to be complied with in order to overcome the above mentioned disadvantages.

These conditions are as follows:

(1) The surfaces of the sprags which are intended to bear against the adjacent sprags on both sides thereof should form sectors of circular cylinders and have a common center line of curvature.

(2) This center line of curvature of these lateral contact surfaces should also be the center line of the curvature of the circular cylindrical sector forming the bearing surface of each sprag which is adapted to engage with the inner surface of the outer race.

(3) For overcoming the dependency of the friction prevailing during the over-running movement upon the rate of speed, the sprags should be designed of such a shape that the center of gravity of the cross-sectional area thereof lies within the common center line of the curvature of the three sectors mentioned above, that is, the two lateral contact surfaces and the outer bearing surface of each sprag.

(4) For the same purpose it is also advisable to design the sprags so that the center of gravity of each of the two recesses in the end surfaces of each sprag which are adapted to receive the energizing springs also lies within the common center line of curvature of the three mentioned sectors.

(5) For reducing the hertzian pressure of the sprags against the inner race, the sector of the bearing surface of each sprag which is adapted to engage with the outer surface of that race should be given a larger radius of curvature than that of the bearing surface which is intended to engage with the outer race.

It is a further object of the present invention to provide an over-running clutch coupling which complies with the above-mentioned conditions.

These and other objects, features, and advantages of the present invention will become further apparent from the following detailed description thereof, particularly when read with reference to the accompanying drawings, in which—

Fig. 2 shows a cross section through one of the sprags of the new clutch taken along line II—II of Fig. 3; while

Figure 1:
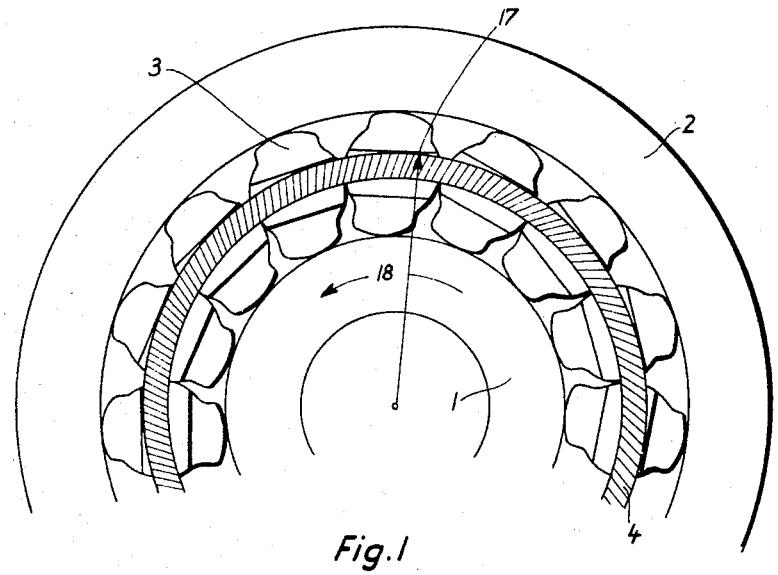
Fig. 1 shows an end view of an over-running clutch according to the invention.

Referring to the drawings, the new over-running clutch essentially consists of an inner race 1, an outer race 2 coaxial with race 1, a plurality of wedge members or sprags 3 of prismatic shape which are interposed between races 1 and 2, and a pair of annular tubular energizing springs 4 which exert a force upon sprags 3 in a radially outward direction and thereby tends to maintain the sprags in the position of engagement with races 1 and 2.

Figure 2:
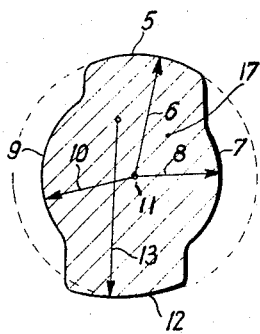

Sprags 3 are all of identical shape and, as illustrated particularly in Fig. 2, each sprag has an outer bearing surface 5, opposite lateral contact surfaces 7 and 9, and an inner bearing surface 12. Each of these surfaces has the shape of a sector of a circular cylinder. The outer bearing surface 5 which is adapted to engage with the inner surface of the outer ring 2 has a radius of curvature 6, while the two lateral contact surfaces 7 and 9 which are adapted to engage with those of the adjacent sprags 3 have a radius of curvature 8 and 10, respectively. According to the invention, the radii of surfaces 5, 7, and 9 have a common center 11. In many actual embodiments of the invention it has been found to be of advantage if this center of curvature 11 also forms the center of gravity of the area of any cross section through the sprags extending parallel to line II—II in Fig. 3.

The bearing surface 12 of each sprag 3, however, which is adapted to engage with the outer surface of the inner race 1 has a radius of curvature 13 which, according to the invention, is larger than the radius 6 of bearing surface 5.

Figure 3:
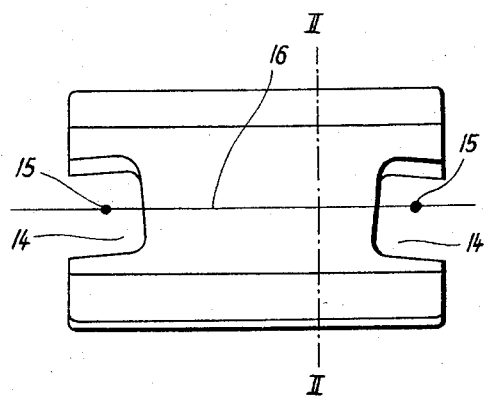
Fig. 3 shows an enlarged side view of one of the sprags.

As indicated in Fig. 3, each sprag 3 has a recess 14 in each end which is adapted to receive one of the energizing springs 4. Each of these recesses is shaped so that the center of gravity 15 of the material which has been cut out therefrom lies within the line 16 which connects the centers of curvature of all sections parallel to line II—II. Such shape and position of the spring-receiving recesses 14 prevents them from affecting the position of the center of gravity of the entire sprag and particularly insures that such center of gravity will always remain within the center line of the curvature of the outer bearing surface 5.

The operation of the new clutch is as follows:

If a relative rotary motion occurs between the inner and outer races 1 and 2 in the direction shown by arrow 18 in Fig. 1, the wedging action of sprags 3 will be diminished so that the inner race 1 can slide along the sprags. Since springs 4 will then exert an outwardly directed pressure upon the eccentrical point 17, they will exert a torque upon each sprag in a counterclockwise direction so that the inner bearing surfaces 12 thereof will be maintained in engagement with the outer surface of race 1. If, however, the inner race 1 is given a relative motion in the direction opposite to arrow 18, it will exert a drag upon the bearing surface 12 of each sprag so that the latter will tighten up to an extent corresponding to the torque to be transmitted.

Since the center line 11 of bearing surface 5 of each sprag also forms the center line of contact surfaces 7 and 9 and the sum of the radii 8 and 10 of all the sprags corresponds to the space required by them and available for them in the peripheral direction in the annular space between the races, a change in the angular position of the sprags will not entail any change in the amount of space required by each sprag in the peripheral direction and will not affect the relative position of surfaces 7 and 9 of one sprag to those of the adjacent sprags. If the center of gravity of each sprag lies within the center line 11 of bearing surface 5, the centrifugal force acting upon such center of gravity will not produce any tilting moment in the sprags even at maximum speeds. Therefore, a change in the rate of speed of the clutch when in the over-running position will not produce any increase or decrease of the friction of the sprags along the races.

According to the invention it is further possible to balance the hertzian pressure of the sprags upon the inner race 1 with that upon the outer race 2. This may be accomplished by giving the inner bearing surface 12 a greater radius of curvature 13 than the outer bearing surface 5. Due to such difference in curvature of the main bearing surfaces of the sprags, a clutch designed according to the present invention will permit a much greater torque carrying capacity than similar clutches of previous design of equal outer dimensions.

Figure 4:
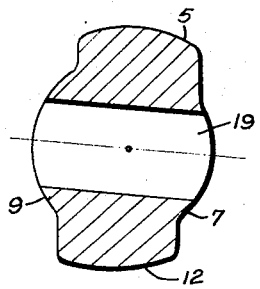
Fig. 4 shows in cross-section a modified form of sprag.
Figure 5:
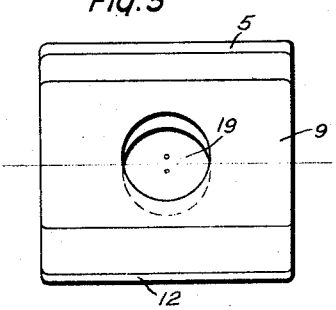
Fig. 5 is a side elevation thereof from the left-hand side of Fig. 4.

Such torque carrying capacity obviously also depends upon the dimensions of the respective over-running clutch and there is practically no limitation on the size of the torque which may be transmitted thereby. If, however, the torque to be transmitted by the new clutch is not as high, and it is also desired that the clutch be made of a narrow width, the same only needs to be provided with relatively short sprags and a single energizing spring. In this case, instead of being provided with two end recesses 14, each sprag only needs as shown in Figs. 4 and 5 a single central aperture 19 through which the spring is passed. Such sprags should comply with substantially the same conditions as specified above with regard to sprags with a pair of end recesses for accommodating two springs.

Although our invention has been illustrated and described with reference to the preferred embodiments thereof we wish to have it understood that it is in no way limited to the details of such embodiments, but is capable of numerous modifications within the scope of the appended claims.

Having thus fully disclosed our invention, what we claim is:

1. An over-running clutch coupling comprising an inner cylindrical race and an outer cylindrical race coaxial with said inner race and spaced therefrom, a plurality of sprags of constant elongated vertical cross section interposed between said inner and outer races, each of said sprags having a pair of cylindrical opposite outer and inner bearing surfaces and a pair of cylindrical opposite lateral contact surfaces, said lateral surfaces being adapted to be in substantially constant engagement with the corresponding contact surfaces of the adjacent sprags and to slide along said last contact surfaces when said sprags are tilted, said outer and inner bearing surfaces being adapted to engage with the inner surface of said outer race and the outer surface of said inner race, respectively, said lateral contact surfaces and said outer bearing surface having a common center line of curvature, the center of gravity of the vertical cross sections of each sprag falling within said common center line of curvature of said outer bearing surface and the two lateral contact surfaces of said sprag, the radii of said lateral contact surfaces being substantially less than the radius of said outer bearing surface, and the radius of said inner bearing surface being substantially greater than the radius of said outer bearing surface, and at least one tubular spring means engaging all of said sprags to maintain the inner bearing surfaces of said sprags in constant engagement with said outer surface of said inner race.

2. An over-running clutch coupling as defined in claim 1, wherein each sprag has at least one recess adapted to receive said tubular spring, the material necessary to fill out said recess prior to its removal having a center of gravity falling within said common center of curvature of said outer bearing surface and the two lateral contact surfaces of said sprag and the center line of gravity of said vertical cross sections of said sprag.

3. An over-running clutch coupling as defined in claim 1, wherein each sprag has a central aperture adapted to receive said tubular spring, the material necessary to fill out said recess prior to its removal having a center of gravity falling within said common center of curvature of said outer bearing surface and the two lateral contact surfaces of said sprag and the center line of gravity of said vertical cross sections of said sprag.

4. An over-running clutch coupling as defined in claim 1, wherein each sprag has a recess in each end, each of said recesses being adapted to receive one of said tubular springs, the material necessary to fill out said recesses prior to its removal having a center of gravity falling within said common center of curvature of said outer bearing surface and the two lateral contact surfaces of said sprag and the center line of gravity of said vertical cross sections of said sprags.

References Cited in the file of this patent

UNITED STATES PATENTS

| | | |
|---|---|---|
| 2,386,013 | Swenson | Oct. 2, 1945 |
| 2,388,424 | Lund | Nov. 6, 1945 |
| 2,477,176 | Gruenberg et al. | July 26, 1949 |
| 2,486,262 | Davis | Oct. 25, 1949 |
| 2,691,435 | Klamp | Oct. 12, 1954 |